(12) United States Patent
Minakawa et al.

(10) Patent No.: US 10,207,232 B2
(45) Date of Patent: Feb. 19, 2019

(54) DISSOLVED HYDROGEN LIQUID-DISCHARGING POT AND METHOD FOR GENERATING PRESSURIZED DISSOLVED HYDROGEN LIQUID

(71) Applicant: Hiroaki Minakawa, Hitachi (JP)

(72) Inventors: Hiroaki Minakawa, Hitachi (JP); Nobuaki Ono, Takahagi (JP); Satoru Takaishi, Hitachi (JP)

(73) Assignee: Hiroaki Minakawa, Hitachi-shi, Ibaraki (JP)

( * ) Notice: Subject to any disclaimer, the term of this patent is extended or adjusted under 35 U.S.C. 154(b) by 0 days.

(21) Appl. No.: 15/529,747

(22) PCT Filed: Jun. 18, 2015

(86) PCT No.: PCT/JP2015/067600
§ 371 (c)(1),
(2) Date: May 25, 2017

(87) PCT Pub. No.: WO2016/203611
PCT Pub. Date: Dec. 22, 2016

(65) Prior Publication Data
US 2017/0341039 A1 Nov. 30, 2017

(51) Int. Cl.
*B01F 3/04* (2006.01)
*B01F 15/02* (2006.01)
*C01B 3/06* (2006.01)
*C02F 1/68* (2006.01)

(52) U.S. Cl.
CPC ...... *B01F 3/04836* (2013.01); *B01F 3/04801* (2013.01); *B01F 15/028* (2013.01);
(Continued)

(58) Field of Classification Search
CPC ........ B01F 3/04836; B01F 2003/04851; B01F 2003/04914; B01F 15/0213;
(Continued)

(56) References Cited

U.S. PATENT DOCUMENTS

2005/0121399 A1* 6/2005 Hayashi ................. A61K 33/00
210/749
2008/0311225 A1* 12/2008 Shiga .................... C02F 1/4606
424/682
(Continued)

FOREIGN PATENT DOCUMENTS

JP 61103526 A * 5/1986 ................ B01F 1/00
JP 2004-275415 A 10/2004
(Continued)

OTHER PUBLICATIONS

International Search Report from International Application No. PCT/JP2015/067600 dated Jul. 28, 2015.

*Primary Examiner* — Darren W Gorman
(74) *Attorney, Agent, or Firm* — Daniel J. Stanger

(57) ABSTRACT

A dissolved hydrogen liquid-discharging pot makes it easier for a user to use hydrogen water by making the pot capable of discharging or spraying a liquid in which hydrogen is dissolved continuously for a constant period at a prescribed pressure. The internal pressure of a pressure chamber, the volume of which has been subdivided by an indicator line on a pot body, is maintained with hydrogen, which is generated by a hydrogen-generating agent disposed in a hydrogen-generating section, at a discharge pressure that is sufficient to discharge all of the liquid inside a bottle section while an on-off valve that opens and closes a discharge tube is closed, and when the on-off valve is opened intermittently or continuously, at a pressure sufficient for continuing discharge of the liquid inside the bottle section and performing continuous discharge of dissolved hydrogen liquid until the bottom of the bottle section is reached.

19 Claims, 6 Drawing Sheets

(52) U.S. Cl.
CPC .......... *C02F 1/685* (2013.01); *B01F 15/0213* (2013.01); *B01F 15/0224* (2013.01); *B01F 2003/04914* (2013.01); *B01F 2215/0022* (2013.01); *B01F 2215/0031* (2013.01); *C01B 3/06* (2013.01); *C02F 2307/02* (2013.01); *Y02E 60/36* (2013.01)

(58) Field of Classification Search
CPC .......... B01F 15/0224; C01B 3/06; C02F 1/68; C02F 1/685; C02F 1/70
See application file for complete search history.

(56) References Cited

U.S. PATENT DOCUMENTS

| | | | |
|---|---|---|---|
| 2010/0284865 A1* | 11/2010 | Sugawara | C01B 3/02 422/162 |
| 2013/0112600 A1* | 5/2013 | Satoh | A23L 2/54 210/136 |
| 2014/0247689 A1 | 9/2014 | Wang et al. | |
| 2015/0291453 A1* | 10/2015 | Kim | C02F 1/4618 204/230.5 |
| 2016/0249725 A1* | 9/2016 | Hasegawa | A45D 34/00 222/96 |
| 2016/0263535 A1* | 9/2016 | Lin | B01F 3/04978 |

FOREIGN PATENT DOCUMENTS

| | | |
|---|---|---|
| JP | 2013-128882 A | 7/2013 |
| JP | 5462426 B1 | 4/2014 |
| JP | 5613853 B1 | 10/2014 |
| JP | 2015-37769 A | 2/2015 |
| JP | 2015-86220 A | 5/2015 |

* cited by examiner

RELATIONSHIP BETWEEN THE VOLUME OF THE PRESSURE
CHAMBER AND THE INTERNAL PRESSURE OF THE
PRESSURE CHAMBER

| Test-No | VOLUME OF PRESSURE CHAMBER (ml) | INTERNAL PRESSURE OF PRESS (MPa) |
|---|---|---|
| 1 | 30 | 0.83 |
| 2 | 40 | 0.58 |
| 3 | 55 | 0.44 |
| 4 | 80 | 0.34 |
| 5 | 105 | 0.27 |
| 6 | 130 | 0.21 |
| 7 | 180 | 0.15 |
| 8 | 230 | 0.11 |
| 9 | 330 | 0.08 |

THE VOLUME OF THE PRESSURE CHAMBER AND THE INTERNAL
PRESSURE OF THE PRESSURE CHAMBER

DISSOLVED HYDROGEN LIQUID-DISCHARGING POT AND METHOD FOR GENERATING PRESSURIZED DISSOLVED HYDROGEN LIQUID

TECHNICAL FIELD

The present invention relates to a dissolved hydrogen liquid-discharging pot and to a method for generating pressurized dissolved hydrogen liquid.

BACKGROUND ART

Many pot-type devices for producing hydrogen-dissolved water have been proposed. They dissolve hydrogen at high concentration in tap water or mineral water. In addition to tap water or mineral water, other drinking liquids such as tea and coffee, or facial cleansing lotion or other similar liquid have been proposed for hydrogen dissolving liquid.

Patent Literature 1 describes a facial care appliance, which is comprised of a hydrogen generating means disposed inside a reaction chamber, a communication tube that communicates the upper part of the inside of the reaction chamber with the lower part of the inside of a container, and a straw. The opening of the straw is positioned in the lower part inside the container to allow to spray hydrogen water contained in the container.

Patent Literature 2 describes a portable type hydrogen water producing apparatus invented by the inventor of the present invention. The invented portable type hydrogen water producing apparatus is comprised of a lid, a main body having a tank that stores liquid, and a hydrogen generating section attached to the lower portion of the tank, wherein the hydrogen generating section that holds hydrogen generating agent generates hydrogen when water is added to the agent and leads out the generated hydrogen to the tank.

LITERATURE OF RELATED ART

Patent Literature

Patent Literature 1: Japanese Unexamined Patent Application Publication No. 2013-128882
Patent Literature 2: Japanese Patent No. 5462426

SUMMARY OF INVENTION

Technical Problem

Whether a device is a pot-style facial treatment appliance designed to spray hydrogen water or a drinking water pot that serves drinking water as hydrogen water, there is a demand for discharging or spraying hydrogen water under a predetermined pressure continuously for a certain period of time. The art described in Patent Literature 1 is capable of spraying hydrogen water but is not able to spray hydrogen water at a prescribed pressure continuously for a certain length of time. Patent Literature 2 mentions that a hydrogen-generating agent is held in an external container to discharge hydrogen water in a good hygienic condition, however, the literature does not mention whether the art is capable of responding to various needs arising in dissolved hydrogen liquid-discharging pots. That is, the literature does not mention that hydrogen water produced in a dissolved hydrogen liquid-discharging pot will be discharged at a prescribed pressure continuously for a certain length of time.

In view of the foregoing, it is therefore an object of the present invention to provide a dissolved hydrogen liquid-discharging pot capable of producing a discharge pressure that meets various demands allowing easy pressure setting with visual recognition aiming at an easy-to-use feature for users.

Means for Solving Technical Problem

A dissolved hydrogen liquid-discharging pot in accordance with the present invention is characterized in that an indicator line is marked on a pot body in a visually confirmable manner to indicate an assumed-boundary between a pressure chamber for storing hydrogen in a bottle section and stored-liquid in the bottle section before generation of hydrogen so that a predetermined volume will be created in the pressure chamber.

The dissolved hydrogen liquid-discharging pot of the present invention is provided with a lid;

a pot body of a predetermined shape having a bottle section that stores liquid therein;

a hydrogen-generating section that communicates with the bottle section and holds a hydrogen-generating agent and generates hydrogen when water is added thereto and leads out the generated hydrogen to the bottle section to create a pressure chamber by the hydrogen generated in the bottle section;

wherein the improvement comprises:

a discharge tube that communicates with the bottle section of the pot body and has a discharge opening for discharging liquid, wherein the sucking tip opening of the discharge tube is positioned to reach the bottom of the bottle section;

an on-off valve provided on the discharge tube for closing and opening the discharge tube;

an operating member for manipulating the on-off valve; and an indicator line marked on the pot body in a visually confirmable manner to indicate an assumed-boundary between the pressure chamber for storing hydrogen in the bottle section and stored-liquid in the bottle section before generation of hydrogen so that a predetermined volume can be created in the pressure chamber according to the indicator line;

wherein a discharge pressure is produced in the pressure chamber, while the on-off valve for opening and closing the discharge tube is closing, on the basis of the volume determined in the position to the indicator line and the determination by the amount of the hydrogen-generating agent, and the discharge pressure is a pressure sufficient to discharge, when the on-off valve is released, all the stored-liquid in the bottle section to the bottom where the sucking tip opening is positioned.

The dissolved hydrogen liquid-discharging pot of the present invention is characterized in that, in the above-described dissolved hydrogen liquid-discharging pot, the indicator line is marked at such a position that the discharge pressure, which is a pressure governed by both the volume of the pressure chamber defined by the position of the indicator line and the amount of the hydrogen-generating agent and is sufficient to discharge all the stored-liquid in the bottle section to the bottom where the sucking tip opening is positioned, becomes an adequate pressure added by 0.01 MPa or more, when the amount of the hydrogen-generating agent is fixed.

The dissolved hydrogen liquid-discharging pot of the present invention is further characterized in that, in the above-described dissolved hydrogen liquid-discharging pot, a spray nozzle is connected to the discharge opening of the discharge tube and the pressure chamber maintains the discharge pressure thereof at a level sufficient for discharging a spray liquid according to setting the position of the indicator line.

The dissolved hydrogen liquid-discharging pot of the present invention is further characterized in that, in the above-described dissolved hydrogen liquid-discharging pot, a drinking-spout is connected to the discharge opening of the discharge tube and the pressure chamber maintains the discharge pressure thereof at a level sufficient for discharging drinking water from the drinking-spout according to setting the position of the indicator line.

A method for producing pressurized hydrogen-dissolved liquid in a dissolved hydrogen liquid-discharging pot of the present invention provided with a lid, a pot body of a predetermined style having a bottle section that stores liquid therein, and a hydrogen-generating section that communicates with the bottle section and holds a hydrogen-generating agent and generates hydrogen when water is added thereto and leads out the generated hydrogen to the bottle section to create a pressure chamber by the hydrogen generated in the bottle section, a discharge tube that communicates with the bottle section of the pot body and has a discharge opening for discharging liquid, an on-off valve provided on the discharge tube for closing and opening the discharge tube, and an operating member for manipulating the on-off valve; wherein the method comprises the steps of:

marking an indicator line on the pot body in a visually confirmable manner to indicate an assumed-boundary between the pressure chamber for storing hydrogen in the bottle section and the stored-liquid in the bottle section before generation of hydrogen so that a predetermined volume can be created in the pressure chamber;

positioning the sucking tip opening of the discharge tube to reach the bottom of the bottle section; and producing a discharge pressure in the pressure chamber, while the on-off valve for opening and closing the discharge tube is closing, on the basis of the volume determined in the position to the indicator line and the determination by the amount of the hydrogen-generating agent;

wherein the discharge pressure is a pressure sufficient to discharge, when the on-off valve is released, the stored-liquid in the bottle section to the bottom where the sucking tip opening is positioned.

The method for producing pressurized hydrogen-dissolved liquid in a dissolved hydrogen liquid-discharging pot of the present invention is further characterized in that, in the above-stated method for producing pressurized hydrogen-dissolved liquid in a dissolved hydrogen liquid-discharging pot, the indicator line is marked at such a position that the discharge pressure, which is a pressure governed by both the volume of the pressure chamber defined by the position of the indicator line and the amount of the hydrogen-generating agent and is sufficient to discharge all the stored-liquid in the bottle section to the bottom where the sucking tip opening is positioned, becomes an adequate pressure added by 0.01 MPa or more when the amount of the hydrogen-generating agent is fixed.

Advantageous Effects of Invention

In the present invention, the indicator line is marked to indicate the assumed-boundary between the pressure chamber for storing hydrogen in the bottle section and the stored-liquid in the bottle section and thereby the pressure chamber of predetermined volume is easily created. Hydrogen generated in the hydrogen-generating section provided outside the bottle section is taken into the pressure chamber. While the on-off valve for opening and closing the discharge tube is closing, the taken-in hydrogen generates the discharge pressure of a pressure level sufficient to discharge all the liquid inside the bottle section. This pressure level is a level that is able to maintain the pressure inside the pressure chamber at a level sufficient to continue the discharge of the hydrogen-dissolved liquid until the liquid level reaches the bottom of the bottle section when the opening operation of the on-off valve is performed intermittently or continuously. As a result, a user can produce discharge pressure compatible with various demands using the dissolved hydrogen liquid-discharging pot, and can easily set the discharge pressure and confirm visually. By discharging or spraying the liquid continuously for a certain period of time under the necessary and sufficient discharge pressure, it is possible to discharge and use all the liquid in the bottle section of the dissolved hydrogen liquid-discharge pot.

BRIEF DESCRIPTION OF DRAWINGS

FIG. 2 This is a graph to show the relationship between the internal pressure of the bottle and the discharged amount of water. FIG. 2(a) is data that show the amount of hydrogen-generating agent, amount of reaction water, measured pressure, discharged amount of water, and discharge time.

FIG. 3 This is a table and a graph that show the relationship between the volume of the pressure chamber (bottle space) and the pressure. FIG. 3(a) is data that show the relationship between the volume of the pressure chamber and the internal pressure of the pressure chamber.

DESCRIPTION OF EMBODIMENTS FOR IMPLEMENTING INVENTION

Figure 1:
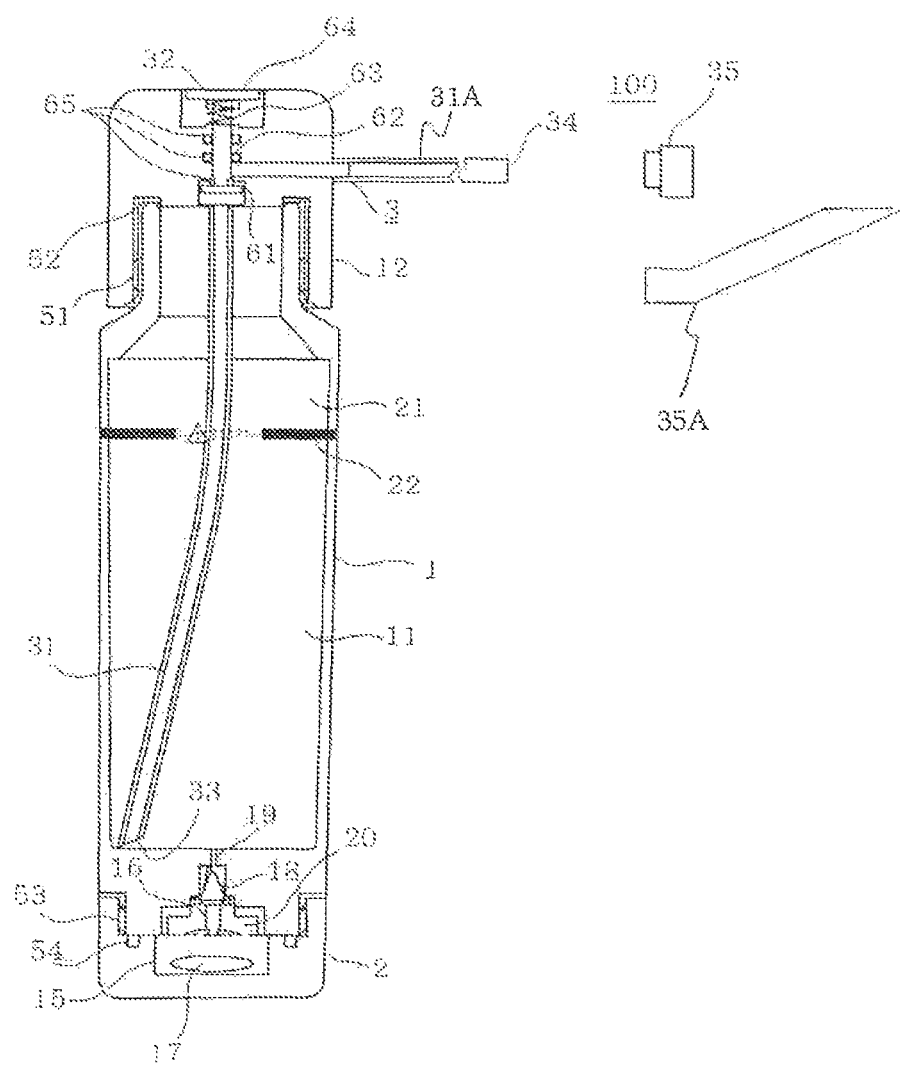
FIG. 1 This is a vertical sectional view of an embodiment of the present invention.

FIG. 1 is a drawing to show a construction of a dissolved hydrogen liquid-discharging pot 100, which is an embodiment of the present invention.

As shown in FIG. 1, the dissolved hydrogen liquid-discharging pot 100 is comprised of a pot body 1 and a hydrogen-generating section 2 and is manufactured in a predetermined shape. The dissolved hydrogen liquid-discharging pot 100 has a discharge means 3 equipped with a discharge opening 34 that discharges liquid.

The external surface of the pot body 1 is cylindrical and the inside thereof forms a bottle section 11 which works as a liquid reservoir and a liquid, into which hydrogen is intended to be dissolved, is stored therein and such liquid becomes a stored-liquid. The liquid reservoir is formed inside the bottle 11. Such liquid is mostly drinking water stored in the pot such as mineral water (water) or tap water. The liquid may be coffee, black tea, or juice; or can be facial treatment liquid or medicated liquid. Hereinafter, the water contained in the pot will be described as drinking water, as a typical example.

The pot body 1 has a top-narrowed shape.

On the top of the pot body 1 having a top-narrowed shape, a lid 12 is provided. The lid 12 is attached to the pot body 1 by screwing through engagement with a thread groove mechanism 51 formed on the outer surface of the pot body 1 and on the inner surface of the lid 12. A flat packing 52 is provided between the pot body 1 and inner surface of the lid 12. The pot body 1 and the lid 12 are shaped to have almost the same outer diameter.

At the lower part of the pot body 1, a construction that allows attaching the hydrogen-generating section 2 is provided. The hydrogen-generating section 2 is installed on the pot body 1 by screwing through engagement with a thread groove mechanism 53 formed on the outer surface of the pot body 1 and the inner surface of the lid 2. The pot body 1 and the hydrogen-generating section 2 are shaped to have almost the same outer diameter.

The hydrogen-generating section 2 has an external shape equivalent to the pot body 1 and a hydrogen-generating space 15 is formed there-inside. The hydrogen-generating space 15 is capable of holding a hydrogen-generating agent 17. A packing 54 is provided between the top surface of the hydrogen-generating section 2 and the bottom surface of the pot body 1. The hydrogen-generating space 15 is connected to a hydrogen gas flow path 16 formed on the pot body side. In the hydrogen gas flow path 16, a check valve 18 is provided. The hydrogen gas flow path 16 is provided in a check valve holder 20, which holds the check valve 18.

The tip portion of the hydrogen gas flow path 16 is formed into an introduction hole 19 of small bore, which opens toward the bottle section 11. Thereby, the hydrogen-generating space 15 is connected to the bottle section 11 via the hydrogen gas flow path 16, the check valve 18, and the introduction hole 19.

The check valve 18 prevents water in the bottle section from leaking into the hydrogen-generating space 15. When water is added to the hydrogen-generating agent 17 held in the hydrogen-generating space 15, hydrogen gas is generated and is introduced into the bottle section 11. A typical example of the hydrogen-generating agent 17 is a mixture consisting of aluminum agent and calcium oxide, and the composition of such mixture is well known. A hydrogen-generating agent other than the mixture consisting of aluminum agent and calcium oxide may be used.

In the present example, the hydrogen-generating section 2 is formed in a shape attached to the lower portion of the pot body 1, however, as is well known, the hydrogen-generating section 2 may be disposed in the bottle section 11, as shown in Patent Literature 1 for example.

An indicator line 22 is marked on the pot body 1 of a predetermined form in a visually confirmable manner to indicate an assumed-boundary between a pressure chamber 21 for storing hydrogen in the bottle section 11 and stored-liquid in the bottle section 11. The indicator line 22 need not be marked on the entire periphery of the pot body 1. The indicator line 22 having a length that allows visual recognition when viewed from one direction is enough. It however may be provided on the entire periphery. A prescribed volume can be created in the pressure chamber 21 by indicating the assumed-boundary between the pressure chamber 21 that stores hydrogen in the bottle section and the stored-liquid in the bottle section before hydrogen generation.

The indicator line 22 is marked horizontally on the pot body 1 to indicate the assumed-boundary between the pressure chamber 21 and the stored-liquid. Therefore, the indicator line 22 works as a boundary line. FIG. 1 illustrates one aspect of the indicator line 22. The indicator line 22 is marked on the bottle section with a predetermined width in a manner that allows visual confirmation. Further, the indicator line 22 is printed on an upper surface or inner surface of the bottle section in a manner that allows visual confirmation. The indicator line 22 may be marked by sticking. With this, the position that parts the pressure chamber 21 from the stored-liquid to produce a predetermined volume of space for the pressure chamber is indicated, which allows visual confirmation of the creation of the pressure chamber and the size of the volume. It is important to be able to confirm visually in that it is easy for the user to find and store the recommended amount of liquid when the user intends to store the drinking water in the pot body 1. The fashion of the indicator line 22 can employ various styles such as a straight line, a straight line formed of asterisks, a straight line formed of symbol marks, etc. As will be described later, the indicator line 22 is marked on a position determined in advance in response to various demands through experiment in consideration of the amount of the discharge water, the discharge strength, the length of the discharge time, etc.

Figure 4:
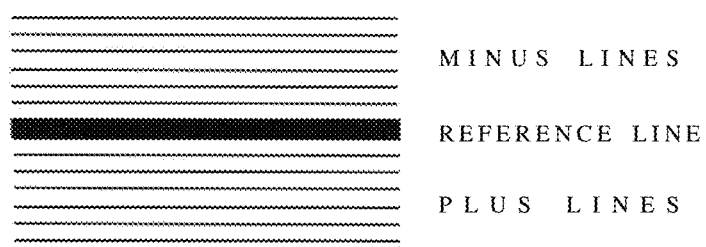
FIG. 4 This shows one embodiment of an indicator line.

As shown in FIG. 4, a plurality of indicator lines 22 may be marked above and below the reference line. In this practice, taking the indicator line, which is used as the guideline for discharging the entire amount of liquid in the bottle, as the reference line, minus lines may be provided as a guideline to be used for reducing the volume in the pressure chamber when increasing the discharge pressure is desired, and plus lines may be provided as a guideline to be used for increasing the volume in the pressure chamber to weaken the discharge pressure when discharging all the liquid in the bottle is not necessary. Which indicator line is suitable and recommended to use is described in an explanatory text.

The discharge means 3 is comprised of a discharge tube 31 and an on-off valve 32 provided in the middle of the discharge means 31. A sucking tip opening 33 of the discharge tube 31 is positioned on the bottom in the bottle section. It is important where to position the tip opening 33 in terms of the discharge amount of the stored-liquid in the bottle section.

The discharge tube 31 can be made of a tube. The other end serves as a discharge opening 34. The sucking tip opening 33 may be positioned so as to reach the bottom. The discharge means 3 is formed in a simplified configuration so as to discharge all the liquid in the bottle section. Here, "discharge all the liquid" naturally means that the entire liquid up to the discharge opening 34 is fully discharged.

In the present example, a push-type on-off valve is used as the on-off valve 32. This on-off valve 32 constitutes an opening-closing body, and includes a valve 61 pressed to the valve seat, a pushing shaft 62 attached to the valve, a spring 63 for normally-pressing the pushing shaft 62 in the closing direction, a push-body 64 for moving the pushing shaft 62 in the closing direction, and a connecting tube 65 for communicating to the discharge tube 31. By pushing the push-body 64 with the finger, the valve 61 separates from the valve seat, and the hydrogen drinking water from the discharge tube 31 flows to another discharge tube 31A. A configuration that holds the pushed position may be employed. In such operation, the position returns to the original position by pushing again.

The style of the on-off valve is not limited to this example. Other styles can be employed as long as they can control discharging.

In this example, the on-off valve 32 of the ON-and-OFF type is used; however, discharge water having the same nature of pressure may be produced by controlling the discharge pressure continuously using a controllable on-off valve that is able to set the degree of opening and closing appropriately.

The hydrogen drinking water is guided from the other discharge tube 31A to the discharge opening 34. On the discharge opening 34, a spraying head 35 is detachably provided. Various kinds of heads may be provided on the discharge opening 34, or a purpose-specific head to the application corresponding to each use may be used. Where an athlete or a general user is to drink hydrogen drinking water, a drinking-spout head 35A is attached. Between the pushing shaft 62 and the inner surface of the lid and between the valve seat 61 and the lid, an O-ring 66 is provided.

The pressure of the pressure chamber 21 of the parted volume is maintained at a particular discharge pressure, which is generated by hydrogen generated from the hydrogen-generating agent 17 of predetermined quantity held in the hydrogen-generating space 15 while the on-off valve 32 for opening and closing the discharge tube 31 is closing. That particular discharge pressure is a pressure that is sufficient to discharge all the liquid in the bottle section and, when the on-off valve is opened intermittently or continuously, enough to continue the discharge of the liquid in the bottle section until the liquid level of the hydrogen-dissolved liquid reaches the bottom of the bottle section. If the on-off valve 32 for opening and closing the discharge tube 31 were not provided, the produced pressure would disappear immediately, and it would become impossible to produce a pressure adequate for discharging all the liquid in the bottle section. Further, failing to produce sufficient discharge pressure prevents a continual discharging of the hydrogen-dissolved liquid.

The inventors conducted an experiment to investigate the relationship between the pressure inside the pressure chamber (pressure in the bottle section) (MPa) and the quantity of discharge water (mL).

Figure 2A:
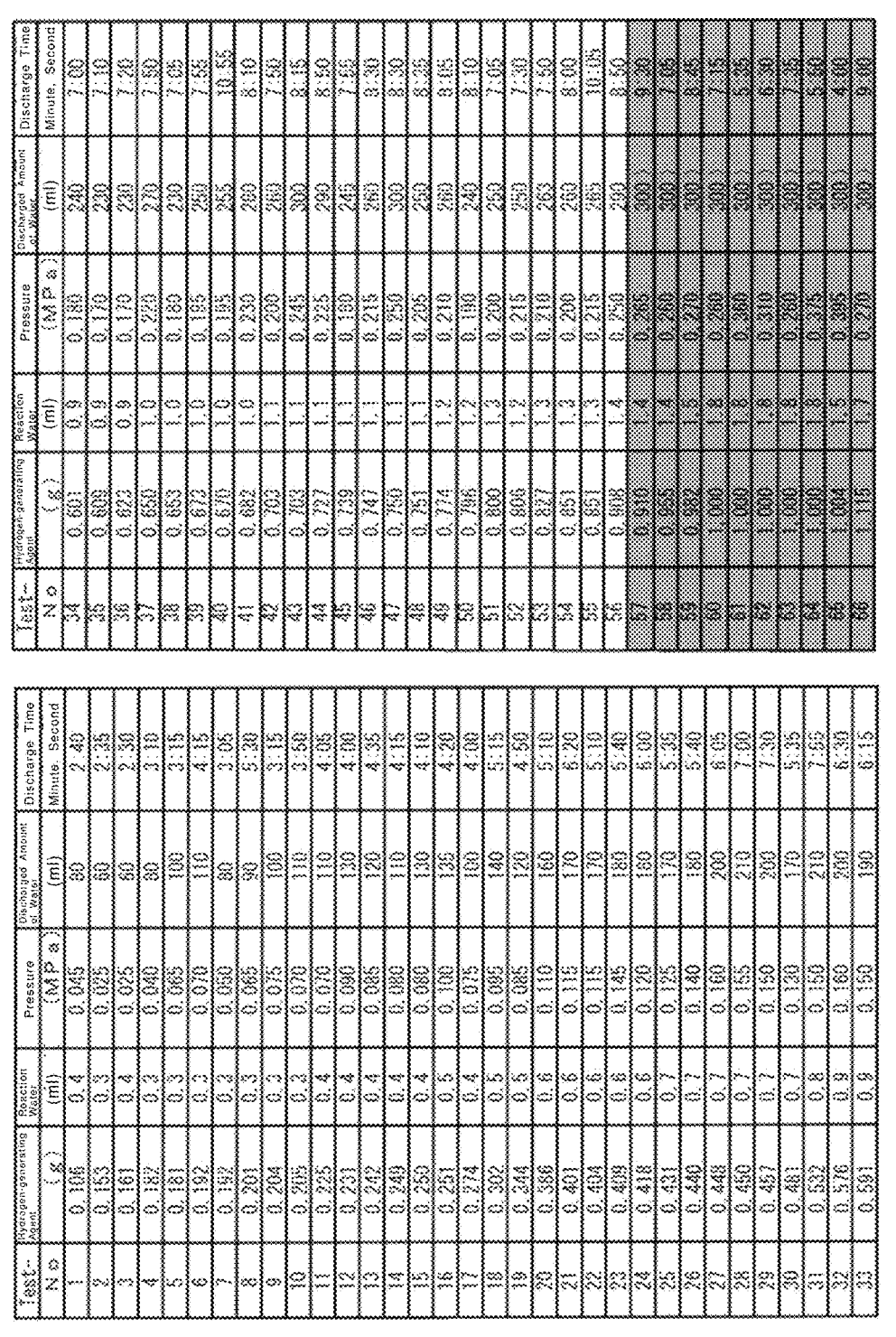
Figure 2B:
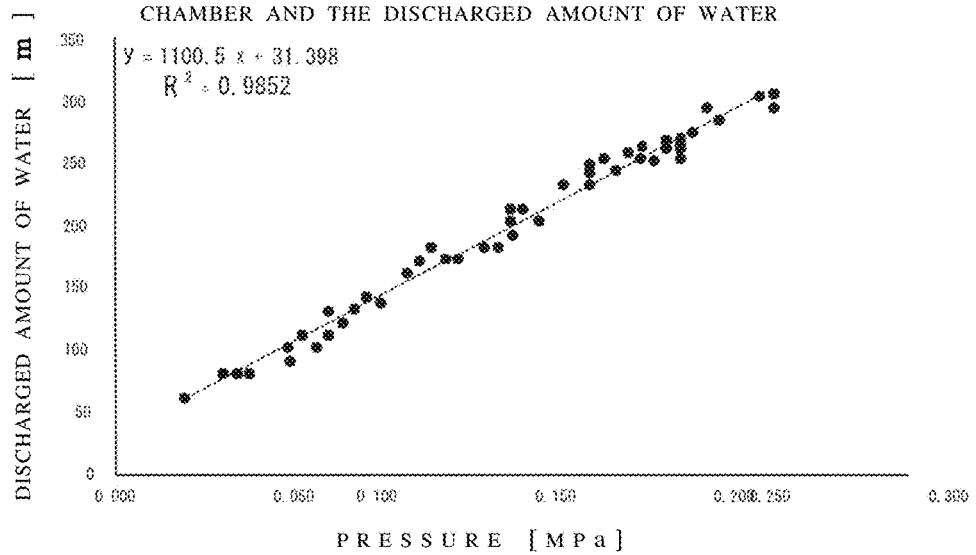
FIG. 2(b) is a graph to show the relationship between the internal pressure of a pressure chamber and the discharged amount of water.

FIG. 2 is a diagram showing the relationship between the pressure produced inside the pressure chamber (internal pressure of the pressure chamber) (MPa) and the quantity of discharge water (mL). The pressure inside the pressure chamber is also the pressure of the pressure chamber 21, that is, the discharge pressure. FIG. 2(*a*) shows the acquired data, and FIG. 2(*b*) graphs the acquired data.

Figure 3B:
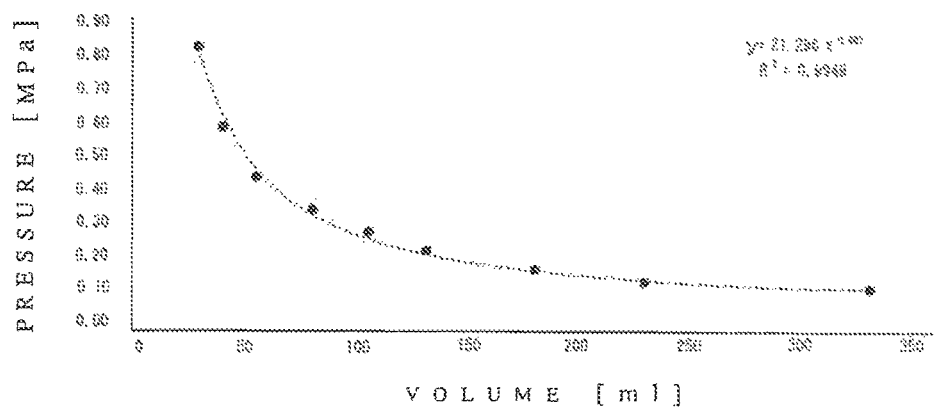
FIG. 3(b) is a graph to show the volume of the pressure chamber and the internal pressure of the pressure chamber.

FIG. 3 shows the relationship between the volume of the pressure chamber and the pressure inside the pressure chamber. FIG. 3(*a*) shows the acquired data, and FIG. 3(*b*) graphs the acquired data.

(Description of Experiment)

The relationship between the internal pressure of the bottle and the quantity of discharge water was investigated when hydrogen water was produced with the dissolved hydrogen liquid-discharge pot shown in FIG. 1.

(Experimental Equipment)
Hydrogen-dissolved liquid discharging pot (Personal 2007 Hydrogen Server, manufactured by DreamMax Co., Ltd.):
Capacity of pot body (380 mL)
Liquid volume (300 mL),
Pressure chamber capacity (80 mL),
Pressure chamber capacity/Pot body capacity: 80 mL/380 m≈0.2 (20%)
Hydrogen-generating agent: Mixture consisting of aluminum material and calcium oxide (Hydrogen-generating agent manufactured by Dream Max Co., Ltd.)
Pressure gauge: Commercially available pressure gauge, partly modified by the inventors of the present invention
Hydrogen water: Hydrogen-dissolved drinking water (drinking hydrogen-water)

(Experimental Method)
1. Produce hydrogen drinking water using the dissolved hydrogen liquid-discharging pot.
2. In producing, change the internal pressure of the pressure chamber by regulating the amount of both the hydrogen-generating agent and reaction water.
3. Measure the internal pressure of the pressure chamber and the discharge amount at each condition and investigate their relationship.

(Experimental Results)

The results of the experiment are shown in FIG. 2(*a*) and FIG. 2(*b*). FIG. 2(*a*) shows quantity of the hydrogen-generating agent (g), quantity of the reaction water (mL), the measured pressure (MPa), quantity of the discharge water (mL), and the discharge time for each Test No., and FIG. 2(*b*) is a graph showing the relationship between the pressure (MPa) and quantity of the discharge water (mL) on the basis of the data shown in FIG. 2(*a*). FIG. 3(*a*) shows data showing the relationship between pressure chamber volume (mL) for each of other Test No. and pressure of the pressure chamber (MPa) and FIG. 3(*b*) shows a graph of the data obtained from the above.

(Discussion)

From the experimental results, a correlation was seen among the internal pressure of the pressure chamber, the volume of the pressure chamber, and the quantity of the discharge water. Accordingly, the internal pressure of the pressure chamber and the volume of the pressure chamber determine the quantity of the discharge water. They have an unambiguous relationship with the quantity of the hydrogen-generating agent, and therefore, this relationship means that to specify the pressure in the pressure chamber is to determine the amount of use of the hydrogen-generating agent. The pressure of the pressure chamber and the volume of the pressure chamber play an important role in discharging hydrogen drinking water in the bottle.

As FIG. 2(*a*) shows, the pressure of 0.25 MPa discharges all the liquid in the bottle section. The pressure of 0.25 MPa is the pressure needed to fully discharge the liquid in the bottle section. As shown in FIG. 2(*b*), a pressure of 0.26 MPa is adopted including a margin for reliable discharge. The pressure of 0.26 MPa is a pressure sufficient to fully discharge the liquid in the bottle section.

Thus, a pressure of 0.25 MPa or more is necessary in order to discharge the hydrogen drinking water (300 mL) which is the amount of the liquid in the bottle section. Therefore, the pressure of 0.26 MPa, which is 0.01 MPa addition to 0.25 MPa, is necessary and sufficient pressure in order to promptly discharge all the hydrogen drinking water (300 mL) in the bottle section, because it is possible to discharge 50 mL by 0.05 MPa of pressure. Depending on need, 0.3 MPa of pressure may be employed corresponding to the user's needs for example. Therefore, the necessary and sufficient pressure means the pressure which is defined as a pressure defined by addition of a slight pressure to the pressure necessary for discharging the hydrogen-dissolved liquid until the liquid level reaches the bottom of the bottle section. The slight pressure means 0.01 MPa of pressure for addition to the necessary pressure (0.25 MPa for example). 0.01 MPa or more is to be added. For example, a pressure of 0.01 to 0.05 MPa is added. With this, it is made unnecessary to use a larger amount of hydrogen-generating agent than needed. The volume of the pressure chamber is an important factor to maintain these pressures. This means that it is important to provide the indicator line 22 on the surface of the pot body to indicate the boundary with the liquid surface indicating the size of the pressure chamber 21. The position of the indicator line 22 can be determined in advance through several experiments conducted in response to various needs considering the amount of discharge water, the strength of discharge, and the time-length of discharge. It is preferable to position the indicator line 22 so as to allow the user to easily confirm with a visual angle, considering that the liquid is stored by the user in the dissolved hydrogen liquid-discharge pot. It is enough that confirmation is possible. When the volume of the pressure chamber 21 increases, the inclination (gradient) shown in FIG. 2(a) becomes gentle, and when the volume of the pressure chamber 21 decreases, the inclination becomes steep, but the tendency does not change. In either case, the importance of providing the indicator line 22 remains unchanged. An auxiliary material such as a blowing agent may be used to produce the internal pressure in the pressure chamber. Even if a blowing agent is used, it does not go beyond the idea of the present invention.

This indicates that, when the pot of a certain style is used, the discharge amount and the discharge time are determined by the internal pressure of the pressure chamber of a certain form; and the internal pressure of such pressure chamber is determined by 1. amount of the hydrogen-generating agent and 2. size of the pressure chamber volume.

When the volume of the pressure chamber 21 and the internal pressure of the pressure chamber are determined, the amount of hydrogen generated (that is, the amount of the hydrogen-generating agent), the discharge amount, and the discharge time are uniquely determined. Therefore, the pressure chamber volume and the internal pressure of the pressure chamber are to be determined in order to decide the total discharge amount from the pot body. Also, when the pressure chamber volume and the internal pressure of the pressure chamber are determined, the discharge amount from the pot body is determined.

In the present embodiment, as described above, the indicator line 22 is provided on the pot body 1 in a style that allows visual confirmation to indicate the position of the assumed-boundary between the pressure chamber for storing hydrogen and the liquid level of the stored-liquid in the bottle section before hydrogen generation; and thereby a predetermined volume is set in the pressure chamber 21. The user can easily set a predetermined volume in the pressure chamber 21 using the indicator line 22.

Providing in the bottle section the indicator line 22 which shows the position of the assumed-boundary between the pressure chamber 21, which stores hydrogen, and the stored-liquid allows an eased producing of the pressure chamber 21 having predetermined volume and makes it possible to reduce the use-amount of the hydrogen-generating agent 17 necessary for discharging all the drinking water in the pot body as much as possible.

The discharge pressure is produced in the pressure chamber 21 while the on-off valve 32 for opening and closing the discharge tube 31 is closing. This discharge pressure is governed by both the volume defined by the position of the indicator line 22 and the amount of the hydrogen-generating agent 17. The discharge pressure is produced to be the pressure sufficient to discharge the stored-liquid in the bottle section to the bottom where the sucking tip opening 33 of the discharge tube 31 is positioned, when the on-off valve is released.

In many cases, the hydrogen-generating agent 17 of a definite quantity is provided packed in a sachet and one sachet of the hydrogen-generating agent is used. An adequate quantity of water is added in using the agent. Controlling the quantity of the hydrogen-generating agent 17 in accordance with each use results in increase of costs for maintaining versatility. In contrast to this, providing the indicator line 22 is easy, and the cost increase can be kept to a minimum Providing the indicator line on a preferential basis has a superiority compared to controlling the quantity of the hydrogen-generating agent 17.

The indicator line position is set at a place such that the discharge pressure becomes a sufficient discharge pressure including addition of 0.01 MPa or more when the amount of the hydrogen-generating agent 17 is fixed. Such discharge pressure, which is governed by both the volume of the pressure chamber 21 defined by the position of the indicator line 22 and the amount of the hydrogen-generating agent 17, is to be sufficient to discharge all the stored-liquid in the bottle section to the bottom where the sucking tip opening of the discharge tube is positioned.

The spray nozzle is connected to the discharge opening of the discharge tube and the pressure chamber 21 is maintained at a discharge pressure sufficient to discharge the spray liquid in accordance with setting the position of the indicator line 22 when the amount of the hydrogen-generating agent 17 is fixed. The spray nozzle may be fixed to the discharge opening 34 in advance.

The drinking-spout 35A is also connected to the discharge opening 34 of the discharge tube 31 and the pressure chamber 21 is maintained at a discharge pressure sufficient to discharge the drinking water from the drinking-spout 35A in accordance with setting the position of the indicator line 22 when the amount of the hydrogen-generating agent 17 is fixed. The drinking-spout 35A may be fixed to the discharge opening 34 in advance. It may be practicable to employ a configuration that allows selection of the spray nozzle or the drinking-spout 35A as needed.

Hydrogen generated in the hydrogen-generating section 15 provided outside the bottle section is taken into the pressure chamber. While the on-off valve for opening and closing the discharge tube is closing, the taken-in hydrogen generates the discharge pressure of a pressure level sufficient to discharge all the liquid in the bottle section. This pressure level is a level that is able to maintain the pressure at a level sufficient to continue the discharge of the hydrogen-dissolved liquid until the liquid level reaches the bottom of the bottle section continuing discharge of the liquid in the bottle section when the opening operation of the on-off valve is performed intermittently or continuously. As a result, a user can produce discharge pressure compatible with various demands using the dissolved hydrogen liquid-discharging pot, and can easily set such discharge pressure allowing visual confirmation. By discharging or spraying the liquid continuously for a certain period of time under the necessary and sufficient discharge pressure, it is possible to discharge and use all the liquid in the bottle section of the dissolved hydrogen liquid-discharge pot.

REFERENCE SIGNS LIST

1. Pot body
2. Hydrogen-generating section
3. Discharge means
11. Bottle section
12. Lid
15. Hydrogen-generating space
16. Hydrogen gas flow path
17. Hydrogen-generating agent
18. Check valve
19. Introduction hole
21. Pressure chamber
22. Indicator line (boundary line)
31. Discharge pipe (tube)
32. On-off valve
33. Tip opening
34. Discharge opening
35. Spraying head
100. Dissolved hydrogen liquid-discharging pot (pot)

The invention claimed is:

1. A dissolved hydrogen liquid-discharging pot comprising:
   a lid,
   a pot body having a bottle section that stores liquid therein,
   a hydrogen-generating section that communicates with the bottle section, holds a hydrogen-generating agent and generates hydrogen when water is added thereto, and leads out the generated hydrogen to the bottle section to create a pressure chamber in the bottle section,
   a discharge tube that communicates with the bottle section of the pot body and has a discharge opening for discharging liquid, wherein a sucking tip opening of the discharge tube is positioned to reach a bottom of the bottle section,
   an on-off valve provided on the discharge tube for closing and opening the discharge tube,
   an operating member for manipulating the on-off valve, and
   an indicator line marked on the pot body in a visually confirmable manner to indicate the assumed-boundary between the pressure chamber for storing hydrogen in the bottle section and stored-liquid in the bottle section before generation of hydrogen so that a predetermined volume can be created in the pressure chamber according to the indicator line,
   wherein a discharge pressure, which is governed by both the volume of the pressure chamber defined by the position of the indicator line and the amount of the hydrogen-generating agent, is produced in the pressure chamber in accordance with one or more of opening or closing the on-off valve, and
   the discharge pressure is a pressure sufficient to discharge, when the on-off valve is opened, all the stored-liquid in the bottle section to the bottom where the sucking tip opening is positioned.

2. The dissolved hydrogen liquid-discharging pot according to claim 1, further characterized in that the indicator line is marked at such a position that the discharge pressure, which is a pressure governed by both the volume of the pressure chamber defined by the position of the indicator line and the amount of the hydrogen-generating agent and is sufficient to discharge all the stored-liquid in the bottle section to the bottom where the sucking tip opening is positioned, becomes an adequate discharge pressure obtained by adding 0.01 MPa or more to the pressure needed to discharge all the stored-liquid in the bottle section, when the amount of the hydrogen-generating agent is fixed.

3. The dissolved hydrogen liquid-discharging pot according to claim 1, further characterized in that a spray nozzle is connected to the discharge opening of the discharge tube and the pressure chamber maintains the discharge pressure thereof at a level sufficient for discharging a spray liquid according to setting the position of the indicator line.

4. The dissolved hydrogen liquid-discharging pot according to claim 1, further characterized in that a drinking-spout is connected to the discharge opening of the discharge tube and the pressure chamber maintains the discharge pressure thereof at a level sufficient for discharging drinking water from the drinking-spout according to setting the positon of the indicator line.

5. A method for producing pressurized hydrogen-dissolved liquid in a dissolved hydrogen liquid-discharging pot provided with
   a lid,
   a pot body of a predetermined style having a bottle section that stores liquid therein, and
   a hydrogen-generating section that communicates with the bottle section, holds a hydrogen-generating agent and generates hydrogen when water is added thereto, and leads out the generated hydrogen to the bottle section to create a pressure chamber in the bottle section,
   a discharge tube that communicates with the bottle section of the pot body and has a discharge opening for discharging liquid,
   an on-off valve provided on the discharge tube for closing and opening the discharge tube,
   and
   an operating member for manipulating the on-off valve;
   wherein the method comprises the steps of:
   marking an indicator line on the pot body in a visually confirmable manner to indicate an assumed-boundary between the pressure chamber for storing hydrogen in the bottle section and the stored-liquid in the bottle section before generation of hydrogen so that a predetermined volume can be created in the pressure chamber;
   positioning a sucking tip opening of the discharge tube to reach a bottom of the bottle section; and
   producing a discharge pressure in the pressure chamber in accordance with one or more of opening or closing the on-off valve, which discharge pressure is governed by both the volume of the pressure chamber defined by the position of the indicator line and the amount of the hydrogen-generating agent;
   wherein
   the discharge pressure is a pressure sufficient to discharge, when the on-off valve is opened, the stored-liquid in the bottle section to the bottom where the sucking tip opening is positioned.

6. The method for producing pressurized hydrogen-dissolved liquid in the dissolved hydrogen liquid-discharging pot according to claim 5 further characterized in that the indicator line is marked at such a position that the discharge pressure, which is a pressure governed by both the volume of the pressure chamber defined by the position of the indicator line and the amount of the hydrogen-generating agent and is sufficient to discharge all the stored-liquid in the bottle section to the bottom where the sucking tip opening is positioned, becomes an adequate discharge pressure obtained by adding 0.01 MPa or more to the pressure needed to discharge all the stored-liquid in the bottle section, when the amount of the hydrogen-generating agent is fixed.

7. The dissolved hydrogen liquid-discharging pot according to claim 1, further comprising a plurality of indicator lines including the indicator line,
wherein the plurality of indicator lines other than the indicator line include first indicator lines positioned above the indicator line and second indicator lines positioned below the indicator line as guidelines for decreasing and increasing the volume in the pressure chamber, respectively.

8. The dissolved hydrogen liquid-discharging pot according to claim 1, wherein the hydrogen-generating section has a hydrogen-generating space to hold the hydrogen-generating agent, and an external shape equivalent to an external shape of the bottle section.

9. The dissolved hydrogen liquid-discharging pot according to claim 1, further comprising a check valve arranged to permit hydrogen gas generated in the hydrogen-generating section to pass from the hydrogen-generating section into the bottle section and to prevent water from passing from the bottle section into the hydrogen-generating section.

10. The dissolved hydrogen liquid-discharging pot according to claim 9, further comprising a check valve holder configured to hold the check valve, wherein the check valve holder has a hydrogen gas flow path arranged to lead out hydrogen generated in the hydrogen-generating section to the bottle section to create the pressure chamber.

11. A dissolved hydrogen liquid-discharging pot, comprising:
a lid,
a pot body having a bottle section configured to store liquid and hydrogen therein,
a hydrogen-generating section configured for fluid communication with the bottle section and hold a hydrogen-generating agent and water,
a discharge tube configured to extend from a sucking tip opening thereof on a bottom of the bottle section to a discharge opening,
an on-off valve configured to close and open the discharge tube to permit fluid communication between the sucking tip opening and the discharge opening,
an operating member accessible at the lid and configured to manipulate the on-off valve to close and open the discharge tube to disable and enable the fluid communication, respectively, and
a visually confirmable indicator on the pot body to indicate an assumed-boundary between a predetermined volume of hydrogen gas in the bottle section and the stored-liquid in the bottle section,
wherein the assumed-boundary defines a pressure chamber in which the hydrogen gas in the bottle section generates a discharge pressure sufficient to discharge, when the on-off valve is opened, the stored-liquid in the bottle section from the position of the sucking tip opening on the bottom of the bottle section.

12. The dissolved hydrogen liquid-discharging pot according to claim 11, wherein the assumed-boundary indicated by the indicator is positioned on the pot body at least 0.01 MPa greater than a position corresponding to the minimum discharge pressure sufficient to discharge, when the on-off valve is opened, the stored-liquid in the bottle section from the position of the sucking tip opening on the bottom of the bottle section.

13. The dissolved hydrogen liquid-discharging pot according to claim 11, further comprising a spray nozzle operably coupled to the discharge opening,
wherein the indicator is positioned for a discharge pressure that is sufficient to discharge a spray of the stored-liquid via the spray nozzle.

14. The dissolved hydrogen liquid-discharging pot according to claim 11, further comprising a drinking-spout operably coupled to the discharge opening,
wherein the indicator is positioned for a discharge pressure that is sufficient to discharge the stored-liquid for drinking from the drinking-spout.

15. The dissolved hydrogen liquid-discharging pot according to claim 11, wherein the indicator is linear.

16. The dissolved hydrogen liquid-discharging pot according to claim 11, wherein the hydrogen-generating section has a hydrogen-generating space to hold the hydrogen-generating agent and water, and an external shape equivalent to an external shape of the bottle section.

17. The dissolved hydrogen liquid-discharging pot according to claim 11, further comprising a check valve arranged to permit hydrogen gas generated in the hydrogen-generating section to pass from the hydrogen-generating section into the bottle section and to prevent water from passing from the bottle section into the hydrogen-generating section.

18. The dissolved hydrogen liquid-discharging pot according to claim 17, further comprising a check valve holder configured to hold the check valve, wherein the check valve holder has a hydrogen gas flow path arranged to lead out hydrogen generated in the hydrogen-generating section to the bottle section to create the pressure chamber.

19. The dissolved hydrogen liquid-discharging pot according to claim 11, wherein the indicator includes a reference line and the dissolved hydrogen liquid-discharging pot further comprises a plurality of indicator lines including the reference line,
wherein the plurality of indicator lines other than the reference line include first indicator lines positioned above the reference line and second indicator lines positioned below the reference line as guidelines for decreasing and increasing the volume in the pressure chamber, respectively.

* * * * *